United States Patent
Horie et al.

(10) Patent No.: US 9,249,828 B2
(45) Date of Patent: Feb. 2, 2016

(54) ROLLING GUIDANCE DEVICE

(71) Applicant: THK CO., LTD., Tokyo (JP)

(72) Inventors: Takuya Horie, Tokyo (JP); Mitsumasa Wada, Tokyo (JP); Ayako Miyajima, Tokyo (JP); Shinya Saito, Tokyo (JP); Takeshi Shimamura, Tokyo (JP); Teruaki Ooka, Tokyo (JP); Hiroyuki Kimura, Tokyo (JP); Marie Horikawa, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/381,821

(22) PCT Filed: Feb. 20, 2013

(86) PCT No.: PCT/JP2013/054154
§ 371 (c)(1),
(2) Date: Aug. 28, 2014

(87) PCT Pub. No.: WO2013/136929
PCT Pub. Date: Sep. 19, 2013

(65) Prior Publication Data
US 2015/0043843 A1    Feb. 12, 2015

(30) Foreign Application Priority Data
Mar. 13, 2012   (JP) .................. 2012-055748

(51) Int. Cl.
*F16C 29/06*    (2006.01)
*F16C 33/50*    (2006.01)

(52) U.S. Cl.
CPC ............. *F16C 29/0607* (2013.01); *F16C 29/06* (2013.01); *F16C 29/065* (2013.01);
(Continued)

(58) Field of Classification Search
CPC ............. F16C 29/0602; F16C 29/0604; F16C 29/0607; F16C 29/0609; F16C 29/0611; F16C 29/0633; F16C 29/0635; F16C 29/0647; F16C 29/0652; F16C 29/0664; F16C 29/065; F16C 29/0666; F16C 29/06; F16C 33/506
See application file for complete search history.

(56) References Cited

U.S. PATENT DOCUMENTS 5,161,896 A * 11/1992 Hofling et al. .................... 384/8
5,570,958 A * 11/1996 Tsukada ......................... 384/45
(Continued)

FOREIGN PATENT DOCUMENTS

JP    60-69822 U    5/1985
JP    7-208467 A    8/1995
(Continued)

OTHER PUBLICATIONS
International Search Report dated Mar. 19, 2013, issued in corresponding application No. PCT/JP2013/054154.

*Primary Examiner* — Alan B Waits
(74) *Attorney, Agent, or Firm* — Westerman, Hattori, Daniels & Adrian, LLP

(57) ABSTRACT

A rolling guide device is capable of preventing a scooping piece formed on a circulation path module from being deformed along with use over time, and enhancing the durability of the scooping piece, thereby achieving smooth motion of a moving member relative to a track member. A moving member includes: a main body member having load rolling surfaces and return paths for rolling elements; direction change pipes having formed therein inner direction change paths and having inner peripheral guide surfaces of outer direction change paths, respectively; and lid members each being mounted on the main body member and having outer peripheral guide surfaces of the outer direction change paths. Each of the direction change pipes includes: a first half circulation segment and a second half circulation segment; and a scooping portion for guiding the rolling elements into each of the inner direction change paths.

5 Claims, 10 Drawing Sheets

(52) U.S. Cl.
CPC ......... *F16C29/0609* (2013.01); *F16C 29/0611* (2013.01); *F16C 29/0666* (2013.01); *F16C 33/506* (2013.01)

(56) References Cited

U.S. PATENT DOCUMENTS

| | | | | |
|---|---|---|---|---|
| 5,727,884 | A * | 3/1998 | Greiner et al. | 384/45 |
| 5,800,064 | A * | 9/1998 | Ohya | 384/44 |
| 6,939,045 | B1 * | 9/2005 | Shing-Neng et al. | 384/45 |
| 7,237,954 | B2 * | 7/2007 | Hsin-Liang et al. | 384/45 |
| 7,296,929 | B2 * | 11/2007 | Hantke et al. | 384/44 |
| 7,802,921 | B2 * | 9/2010 | Wu et al. | 384/44 |
| 7,862,234 | B2 * | 1/2011 | Kuwabara et al. | 384/44 |
| 7,862,236 | B2 * | 1/2011 | Chen | 384/45 |
| 8,057,099 | B2 * | 11/2011 | Pfeuffer et al. | 384/44 |
| 9,022,654 | B2 * | 5/2015 | Liao | 384/13 |
| 2006/0029305 | A1 * | 2/2006 | Akiyama et al. | 384/45 |
| 2009/0016654 | A1 * | 1/2009 | Kakei | 384/44 |
| 2015/0036953 | A1 * | 2/2015 | Wada et al. | 384/44 |

FOREIGN PATENT DOCUMENTS

| | | |
|---|---|---|
| JP | 2005-264984 A | 9/2005 |
| JP | 2006-105296 A | 4/2006 |
| JP | 2009-14177 A | 1/2009 |

* cited by examiner

ROLLING GUIDANCE DEVICE

TECHNICAL FIELD

The present invention relates to a rolling guide device for guiding, in a freely reciprocable manner, a movable member, such as a table, in a work table of a machine tool and a linear guide section or a curved guide section of various conveyance devices.

BACKGROUND ART

Hitherto, this type of rolling guide device includes a track member on which a rolling surface for rolling elements is formed along a longitudinal direction of the track member, and a moving member, which is assembled to the track member through intermediation of a large number of the rolling elements that roll on the rolling surface, and is configured to freely reciprocate along the track member. An endless circulation path for the rolling elements is formed in the moving member. This endless circulation path allows the moving member to move along the track member without any stroke limitation.

In a rolling guide device disclosed in JP 2006-105296 A, the moving member includes a main body member made of a metal, a plurality of circulation path modules mounted on the main body member, and a pair of lid members mounted on the main body member so as to cover the circulation path modules. Load rolling surfaces opposed to the respective rolling surfaces of the track member are formed on the main body member. The rolling elements are configured to roll in a load path defined by the rolling surface and the load rolling surface that are opposed to each other. Further, each circulation path module mounted on the main body member includes a pipe portion inserted into a through hole formed in the main body member, and a direction change portion formed at one end of the pipe portion and arranged on an end surface of the main body member in its moving direction.

A return path for the rolling elements is formed in the pipe portion in parallel to the load path, whereas an inner direction change path for connecting the return path and the load path is formed in the direction change portion. Further, an inner peripheral guide surface of an outer direction change path intersecting with the inner direction change path is formed on an outer surface of the direction change portion. When the lid member is mounted on the main body member so as to cover the circulation path module, the outer direction change path is formed between the direction change portion and the lid member.

The endless circulation path for the rolling elements is formed by a pair of circulation path modules in combination, and the pair of circulation path modules is mounted on the main body member so as to be opposed to each other. At this time, the pipe portions of the respective circulation path modules are inserted into different through holes formed in the main body member, and the distal end of each pipe portion protrudes through the main body member so as to be connected to the outer direction change path formed by the direction change portion of the opposing circulation path module. That is, the endless circulation path looped in an order of the load path, the inner direction change path, the return path, the outer direction change path, and the load path is formed by the pair of circulation path modules in combination. Further, the inner direction change path and the outer direction change path intersect with each other at each direction change portion, and thus two endless circulation paths are formed.

Further, a scooping piece for separating the rolling elements, which have rolled along the load path, off from the track member so as to guide the rolling elements into the inner direction change path is formed on the direction change portion of each circulation path module. On the other hand, a scooping piece for guiding the rolling elements, which have rolled along the load path, into the outer direction change path is not formed on the direction change portion, but is formed on the lid member on which an outer guide surface of the outer direction change path is formed.

CITATION LIST

Patent Literature

[PTL 1] JP 2006-105296 A

DISCLOSURE OF THE INVENTION

Problems to be Solved by the Invention

In the rolling guide device of JP 2006-105296 A, the circulation path module is divided into a first half circulation segment and a second half circulation segment along a center line of each of the inner direction change path and the return path. Therefore, the scooping piece for guiding the rolling elements into the inner direction change path is also divided into two segments along the center line of the inner direction change path, and the segments of the scooping piece are formed on both of the first half circulation segment and the second half circulation segment, respectively.

For this reason, a step may be generated at a center of the scooping piece due to an error in manufacturing the first half circulation segment and the second half circulation segment and an error in assembling the first half circulation segment and the second half circulation segment together, resulting in a risk of increase in rolling resistance at the time when the rolling elements enter the inner direction change path from the load path. Further, when the step is generated, only one of the segments of the scooping piece functions to guide the rolling elements, and the rolling elements repeatedly override the scooping piece, resulting in a risk of partial wear and deformation of the scooping piece. In particular, in application in which the rolling elements are endlessly circulated at high speed, there is a concern over the durability of the scooping piece.

Means for Solving the Problems

The present invention has been made in view of the above-mentioned problems, and has an object to provide a rolling guide device capable of preventing a scooping piece formed on a direction change portion from being deformed along with use over time, and enhancing the durability of the scooping piece, thereby achieving smooth motion of a moving member relative to a track member.

That is, according to one embodiment of the present invention, there is provided a rolling guide device, including: a track member; and a moving member assembled to the track member through intermediation of a large number of rolling elements, the moving member having formed therein a plurality of rolling-element endless circulation paths including inner direction change paths and outer direction change paths intersecting with each other. The moving member includes: a main body member having load rolling surfaces and return paths for the large number of rolling elements; direction change pipes having formed therein the inner direction change paths and having inner peripheral guide surfaces of the outer direction change paths, respectively; and lid members each being mounted on the main body member and having outer peripheral guide surfaces of the outer direction change paths.

Further, each of the direction change pipes includes: a first half circulation segment and a second half circulation segment divided in a plane including each of the inner direction change paths; and a scooping portion for guiding the large number of rolling elements, which are rolling along each of the load rolling surfaces, into the each of the inner direction change paths, the scooping portion being formed only on the first half circulation segment without being formed on the second half circulation segment.

Effects of the Invention

According to one embodiment of the present invention, the scooping portion for guiding the rolling elements, which are rolling along the load path, into the inner direction change path is formed only on the first half circulation segment without being formed on the second half circulation segment, and hence there is no mating surface between the first half circulation segment and the second half circulation segment at the center of the scooping portion. Accordingly, it is possible to avoid the deformation of the scooping portion along with use over time, and to enhance the durability of the scooping portion, thereby being capable of achieving smooth motion of the moving member relative to the track member.

MODE FOR CARRYING OUT THE INVENTION

Now, a rolling guide device of the present invention is described in detail with reference to the accompanying drawings.

Figure 1:
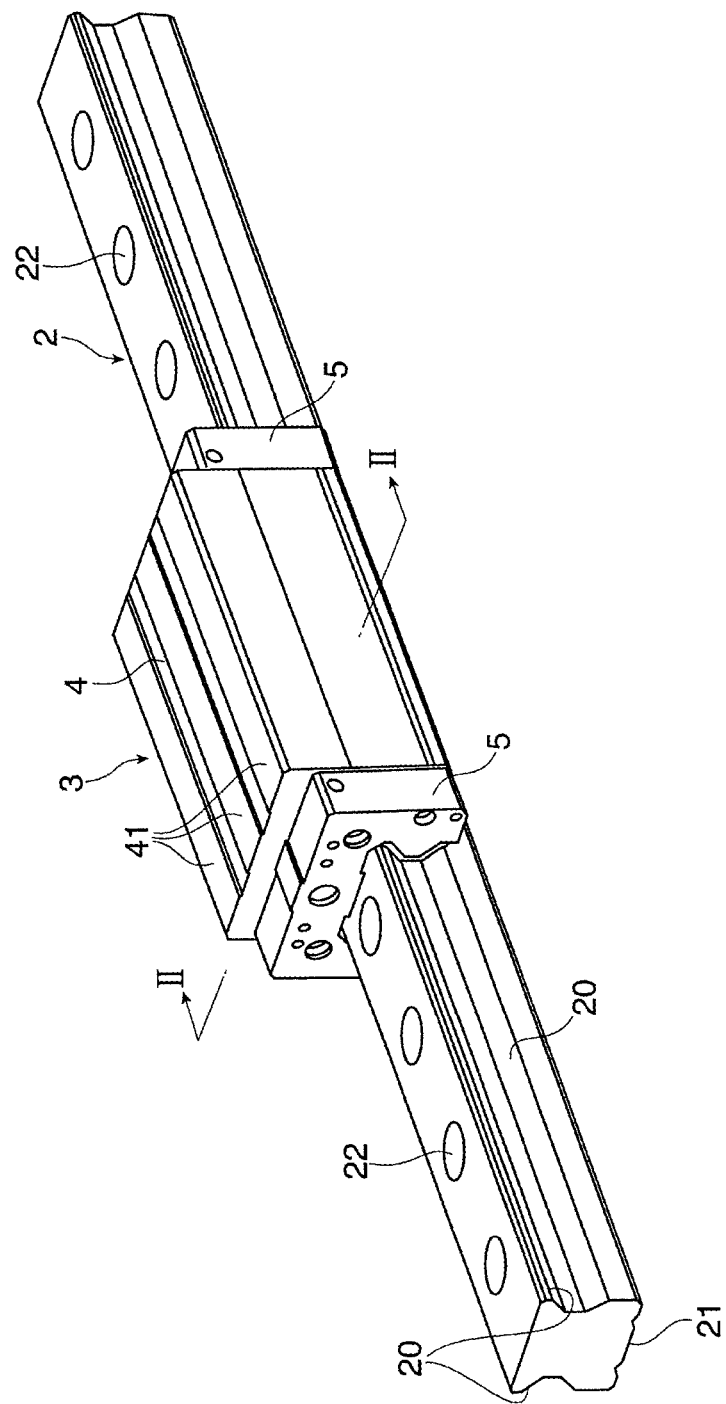
FIG. 1 is a perspective view illustrating an example of a rolling guide device according to an embodiment to which the present invention is applied.
Figure 2:
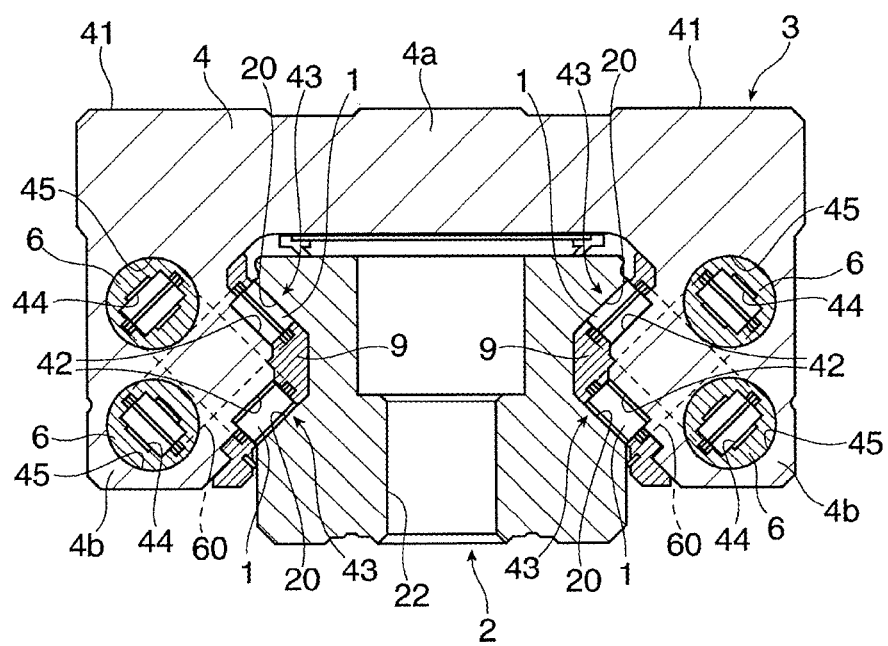
FIG. 2 is a sectional view taken along the line II-II of FIG. 1.

FIGS. 1 and 2 illustrate an example of a rolling guide device according to an embodiment to which the present invention is applied. The rolling guide device includes a track member 2 on which rolling surfaces 20 for rollers 1 serving as rolling elements are formed along a longitudinal direction of the track member 2, and a moving member 3, which is assembled to the track member 2 through intermediation of a large number of the rollers 1, and incorporates endless circulation paths for the rollers 1. The rollers 1 are configured to roll along each of the rolling surfaces 20 of the track member 2 while circulating inside the corresponding endless circulation path, and thus the moving member 3 is freely movable along the longitudinal direction of the track member 2. Note that, balls may be used as the rolling elements for the rolling guide device of the present invention.

The track member 2 is formed into a substantially rectangular shape in cross section, and recessed portions are formed in both side surfaces thereof. The rolling surfaces 20 for the rollers 1 are formed above and below each recessed portion, and four rolling surfaces 20 are formed in the entire track member 2. Each rolling surface 20 is inclined at an angle of 45° relative to a bottom surface 21 of the track member 2. The rolling surface 20 positioned above the recessed portion faces obliquely downward at an angle of 45°, whereas the rolling surface 20 positioned below the recessed portion faces obliquely upward at an angle of 45°. Further, fixing holes 22 for fixing bolts are formed in the track member 2 at predetermined intervals along the longitudinal direction, and are used when the track member 2 is to be laid on machinery or the like. Note that, the arrangement of the rolling surfaces 20 on the track member 2, the inclination angle of the rolling surfaces 20 relative to the track member 2, and the number of the rolling surfaces 20 may be changed as appropriate depending on bearing capacity necessary for the moving member 3.

On the other hand, the moving member 3 includes a main body member 4 having a guide groove for receiving a part of the track member 2, a pair of lid members 5 mounted in the front and rear of the main body member 4 in its moving direction, and circulation path modules 6 mounted on the main body member 4 and covered with the lid members 5 from the outside. Note that, details of the circulation path modules 6 are described later.

The main body member 4 includes a horizontal portion 4a on which a mounting surface 41 for machinery or the like is formed, and a pair of leg portions 4b orthogonal to the horizontal portion 4a. The main body member 4 is arranged on the track member 2 so as to straddle across the track member 2. The mounting surface 41 is formed on the horizontal portion 4a, whereas two load rolling surfaces 42 for allowing the rollers 1 to roll therealong are formed on an inner side of each leg portion 4b. Each rolling surface 20 of the track member 2 and each load rolling surface 42 of the main body member 4 are opposed to each other, to thereby define a load path 43 for allowing the rollers 1 to roll therealong while bearing loads between the main body member 4 and the track member 2. A return path 44 corresponding to each load rolling surface 42 is formed in each leg portion 4b in parallel to the load path 43, and the rollers 1 that have rolled along the load path 43 and are released from the loads then roll along the return path 44 in a direction opposite to the rolling direction in the load path 43. The return path 44 is formed in each circulation path module 6. A part of the circulation path module 6 is inserted into a through hole 45 formed in the main body member 4, and thus the return path 44 is formed in the main body member 4.

Further, the circulation path modules 6 define, together with the lid members 5, direction change paths 60 for connecting the load path 43 and the return path 44. A pair of direction change paths 60 connects both ends of each load path 43 described above and both ends of the return path 44 corresponding to the load path 43, to thereby define the endless circulation path for the rollers 1 inside the moving member 3. As indicated by the broken lines of FIG. 2, the direction change paths 60 connect each load path 43 to the return path 44 positioned obliquely below or above the load path 43, and the direction change paths 60 of the two endless circulation paths defined in each leg portion 4b of the main body member 4 overlap with each other.

Figure 3:
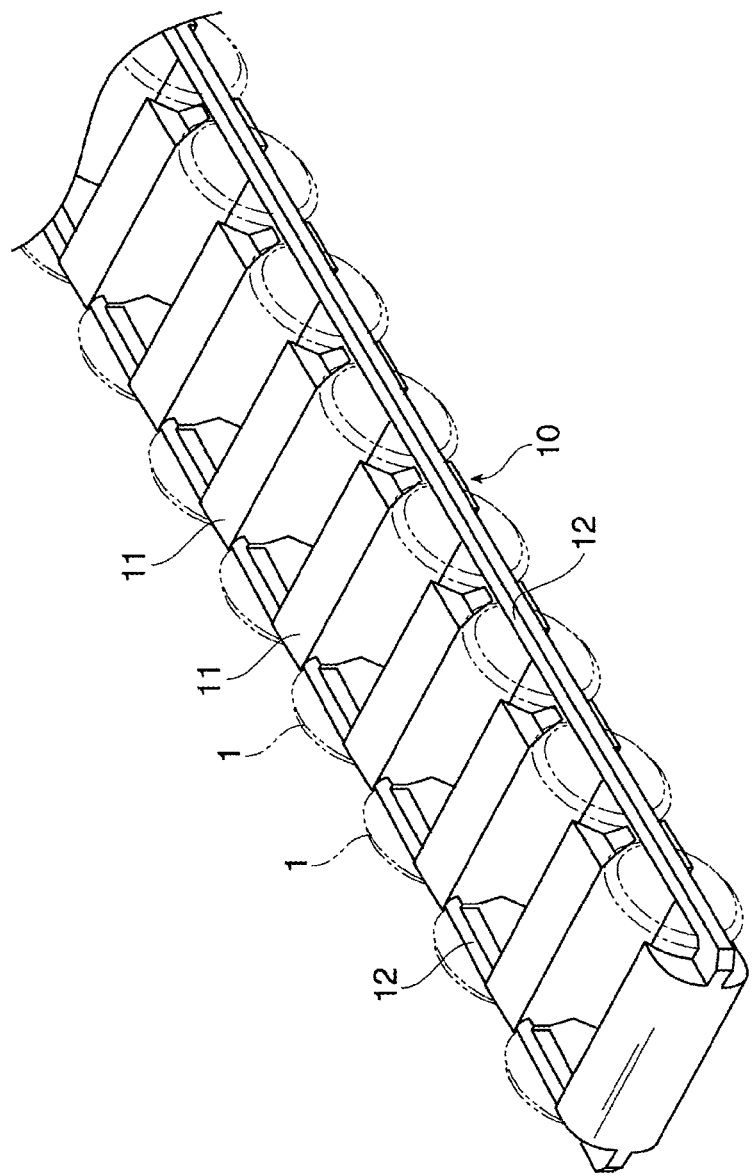
FIG. 3 is a perspective view illustrating a coupler belt having rollers arrayed as rolling elements.

As illustrated in FIG. 3, the rollers 1 are arrayed in line at regular intervals on a flexible coupler belt 10, and are assembled into the endless circulation path together with the coupler belt 10. The coupler belt 10 is formed by injection molding using a synthetic resin, and includes a plurality of spacers 11 each being interposed between the roller 1 and roller 1, and belt portions 12 having the spacers 11 coupled in line. Note that, the rollers 1 may be inserted into the endless circulation path without being arrayed on the coupler belt 10.

Figure 4:
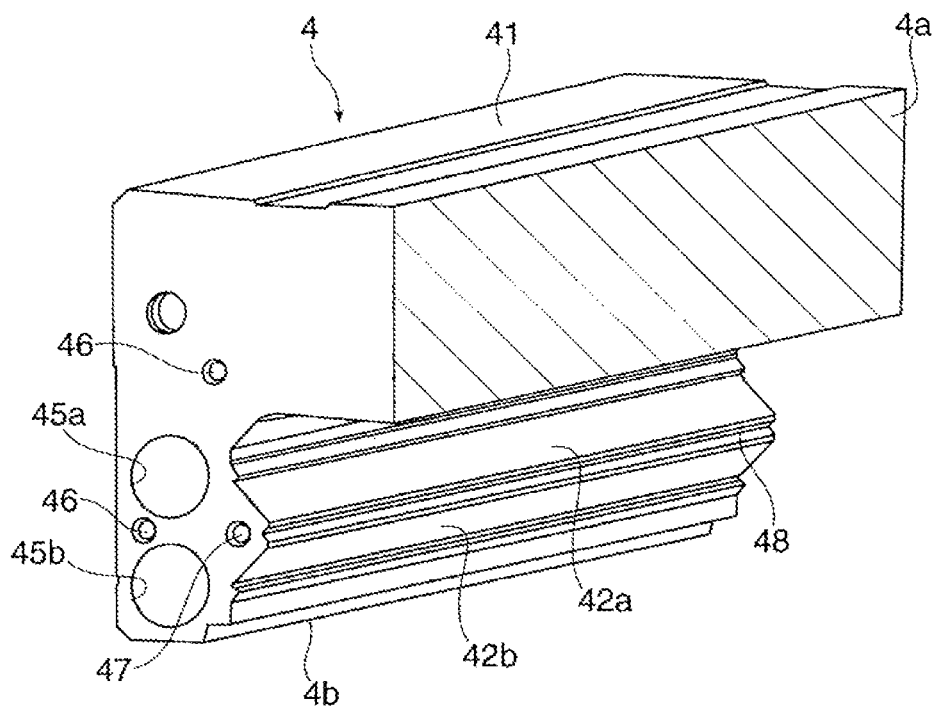
FIG. 4 is a perspective view illustrating a main body member of the rolling guide device according to the embodiment of the present invention.

FIG. 4 is a view illustrating a state in which the lid members 5 and the circulation path modules 6 are removed from the moving member 3. FIG. 4 is a view of the main body member 4 cut into a half at the horizontal portion 4a, for illustrating one of the leg portions 4b alone. As understood from FIG. 4, an upper load rolling surface 42a and a lower load rolling surface 42b are formed on an inner surface of the leg portion 4b of the main body member 4. Further, a lower through hole 45b corresponding to the upper load rolling surface 42a and an upper through hole 45a corresponding to the lower load rolling surface 42b are formed in the leg portion 4b. Parts of the circulation path modules 6 are inserted into the upper through hole 45a and the lower through hole 45b, respectively, to thereby define the return paths 44.

Further, female screw holes 46 for fastening fixing bolts passing through the lid member 5 and a position reference hole 47 for the circulation path module 6 are formed in each end surface of the main body member 4 on which the lid member 5 is to be mounted. The position reference hole 47 is positioned in a region surrounded by the upper load rolling surface 42a, the lower load rolling surface 42b, the upper through hole 45a, and the lower through hole 45b. Still further, a locking groove 48 having a V-shape in cross section is formed in the inner surface of the leg portion 4b at an intermediate position between the upper load rolling surface 42a and the lower load rolling surface 42b. A central holding member 9 (see FIG. 2) for guiding the coupler belt 10 in the load path 43 is positioned relative to the upper load rolling surface 42a and the lower load rolling surface 42b by utilizing the locking groove 48.

Figure 5:
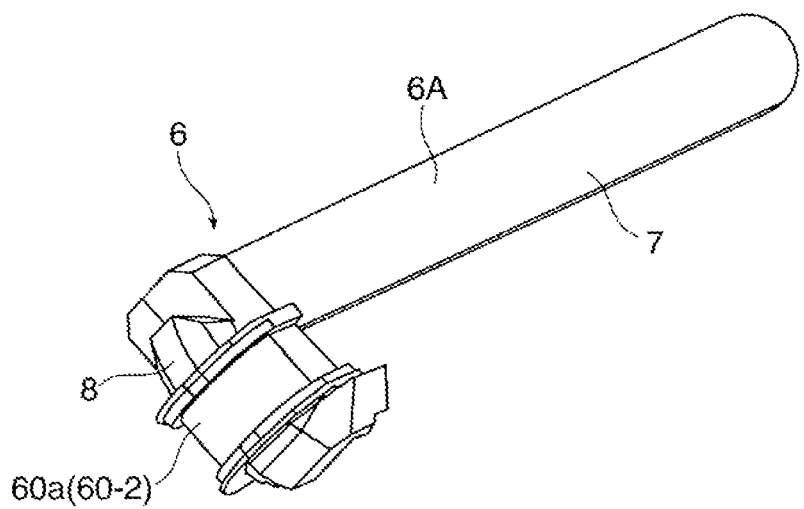
FIG. 5 is a perspective view illustrating a circulation path module of the rolling guide device according to the embodiment of the present invention.
Figure 6:
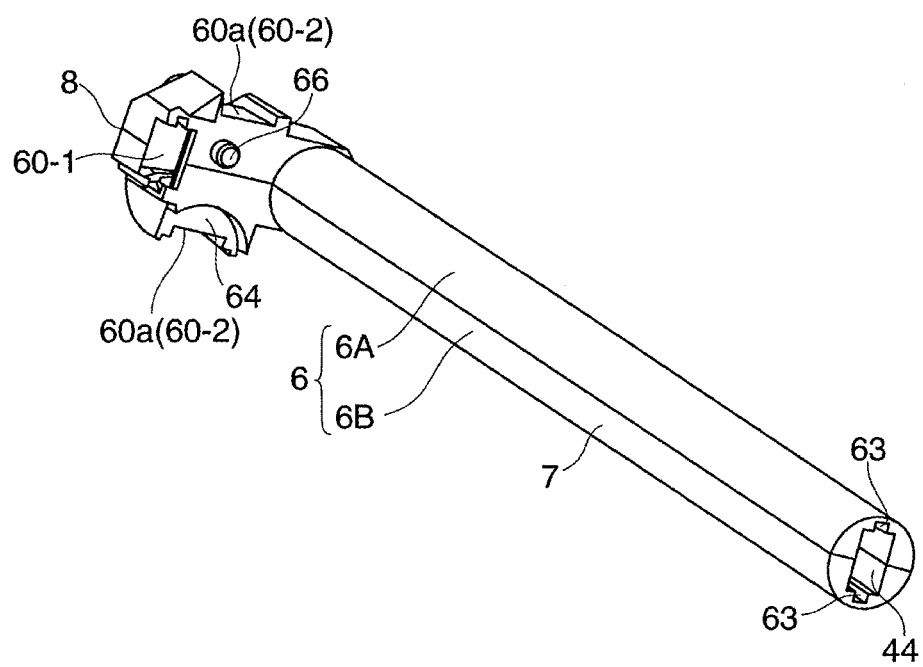
FIG. 6 is a perspective view illustrating the circulation path module of FIG. 5 as seen from a different angle.

FIGS. 5 and 6 are perspective views illustrating the circulation path module 6. The circulation path module 6 includes a return path pipe 7 to be inserted into the through hole 45a or 45b of the main body member 4 and having the return path 44 formed therein, and a direction change pipe 8 for defining the direction change path 60. The return path pipe 7 and the direction change pipe 8 are integrated with each other by injection molding using a synthetic resin. The entire length of the return path pipe 7 is set slightly larger than the length of the through hole 45a or 45b formed in the main body member 4. Note that, the return path pipe 7 and the direction change pipe 8 do not need to be integrated with each other, but may be formed separately and then assembled when being mounted on the main body member 4.

The direction change pipe 8 incorporates an inner direction change path 60-1 curved into a substantially U-shape. The inner direction change path 60-1 is continuous with the return path 44 formed in the return path pipe 7. Further, as illustrated in FIG. 5, on the outer surface of the direction change pipe 8, an inner peripheral guide surface 60a of an outer direction change path 60-2 is formed into an arch-like shape. The outer direction change path 60-2 is formed so as to guide the rollers 1 in a direction intersecting with that of the inner direction change path 60-1, and the inner peripheral guide surface 60a intersects with the inner direction change path 60-1 so as to straddle across an outer wall portion of the direction change pipe 8. Further, as illustrated in FIG. 6, an abutment recessed portion 64 on which a distal end surface of the return path pipe 7 of another circulation path module 6 is brought into abutment is formed in an inner surface of the direction change pipe 8. One end of the inner peripheral guide surface 60a is opened at the abutment recessed portion 64.

Further, in order to position the circulation path module 6 relative to the main body member 4, as illustrated in FIG. 6, a positioning protrusion 66 is formed on the circulation path module 6. The positioning protrusion 66 is fitted into the position reference hole 47 (see FIG. 4) formed in the leg portion 4b of the main body member 4.

Note that, means for positioning the circulation path module 6 relative to the main body member 4 is not limited to the combination of the position reference hole 47 formed in the main body member 4 and the positioning protrusion 66 formed on the circulation path module 6. It is only necessary to provide any locking structure serving as a position reference between the main body member 4 and the circulation path module 6. For example, a protrusion formed on the circulation path module 6 may be pressed against the locking groove 48 having a V-shape in cross section, which is formed in the leg portion 4b of the main body member 4.

Figure 7:
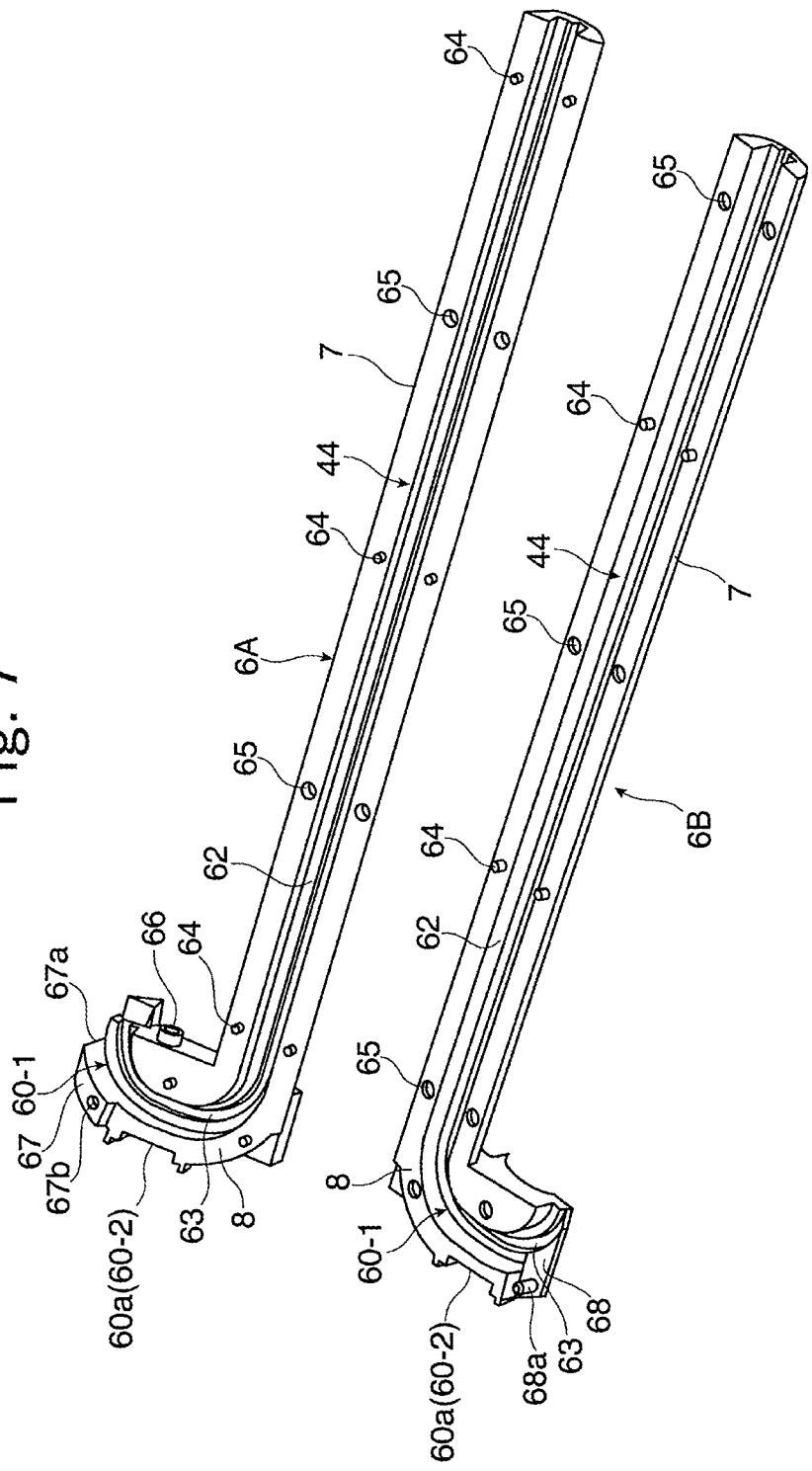
FIG. 7 is an exploded perspective view illustrating the circulation path module.

FIG. 7 is an exploded perspective view illustrating the circulation path module. The circulation path module 6 is divided into a first half circulation segment 6A and a second half circulation segment 6B, and a division plane therebetween includes a center line of each of the return path 44 and the inner direction change path 60-1. Thus, rolling element guide grooves 62 serving as the return path 44 and the inner direction change path 60-1 are formed in the first half circulation segment 6A and the second half circulation segment 6B, respectively, and each of the rolling element guide grooves 62 is continuously formed as a single groove extending from the return path pipe 7 to the direction change pipe 8. Further, a guide groove 63 for receiving the belt portion 12 of the coupler belt 10 is formed in a bottom portion of each of the rolling element guide grooves 62. Still further, the circulation path module 6 is divided into the first half circulation segment 6A and the second half circulation segment 6B so as to be cut across the middle of the inner peripheral guide surface 60a of the outer direction change path 60-2, which is formed into the arch-like shape on the outer surface of the direction change pipe 8.

Protrusions 64 and holes 65 to be fitted together are formed on the first half circulation segment 6A and the second half circulation segment 6B, respectively. When the protrusions 64 and the holes 65 are fitted together, the second half circulation segment 6B is accurately combined with the first half circulation segment 6A, to thereby complete the circulation path module 6 having the return path 44 and the inner direction change path 60-1.

Further, the positioning protrusion 66 formed on the circulation path module 6 is formed on the first half circulation segment 6A of the circulation path module 6. Therefore, at the time of positioning the circulation path module 6 relative to the main body member 4, only the first half circulation segment 6A is positioned with high accuracy relative to the main body member 4, and the second half circulation segment 6B is assembled to the first half circulation segment 6A positioned relative to the main body member 4.

A scooping portion 67 for introducing the rollers 1, which have rolled along the rolling surface 20 of the track member, into the inner direction change path 60-1 is formed in the vicinity of an inlet of the inner direction change path 60-1. Further, the scooping portion 67 is formed on the first half circulation segment 6A, and an edge portion of the scooping portion 67, which faces the inlet of the inner direction change path 60-1, protrudes into a wedge shape so as to serve as a contact edge 67a to be brought into contact with the rollers. On the other hand, a recess 68, into which the scooping portion 67 is fitted, is formed in the second half circulation segment, and a columnar reinforcing protrusion 68a is formed in the recess 68. When the first half circulation segment and the second half circulation segment are combined with each other, the reinforcing protrusion 68a is inserted into a fitting hole 67b, which is formed in the scooping portion 67, in a direction orthogonal to the rolling direction of the rollers 1.

Figure 8:
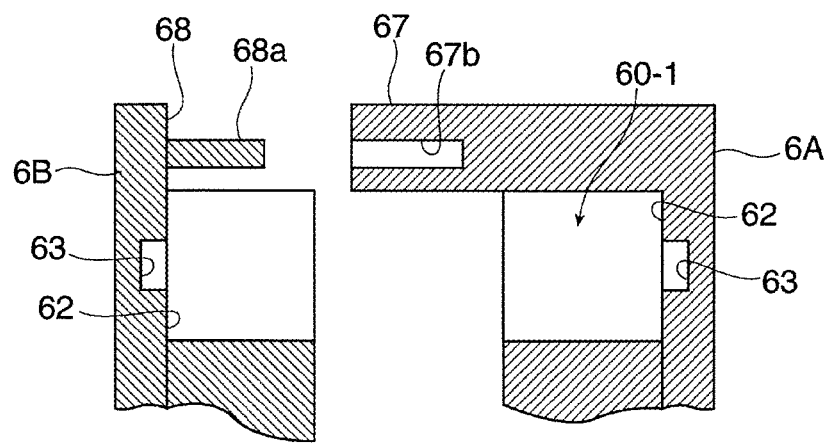
FIG. 8 is a schematic sectional view illustrating the vicinity of a scooping portion before a first half circulation segment and a second half circulation segment are combined with each other.

FIG. 8 is a schematic view illustrating the vicinity of the scooping portion 67 before the first half circulation segment 6A and the second half circulation segment 6B are combined with each other. The scooping portion 67 protrudes from a bottom surface of the rolling element guide groove 62 of the first half circulation segment 6A by an amount corresponding to an axial length of the roller 1. The scooping portion 67 is formed on the first half circulation segment 6A in a cantilever manner. Further, in the recess 68 of the second half circulation segment 6B, into which the scooping portion 67 is fitted, the reinforcing protrusion 68a is formed upright toward the scooping portion 67. Still further, the guide groove 63 for receiving the belt portion 12 of the coupler belt 10 is formed in the bottom surface of the rolling element guide groove 62 formed in each of the first half circulation segment 6A and the second half circulation segment 6B.

Figure 9:
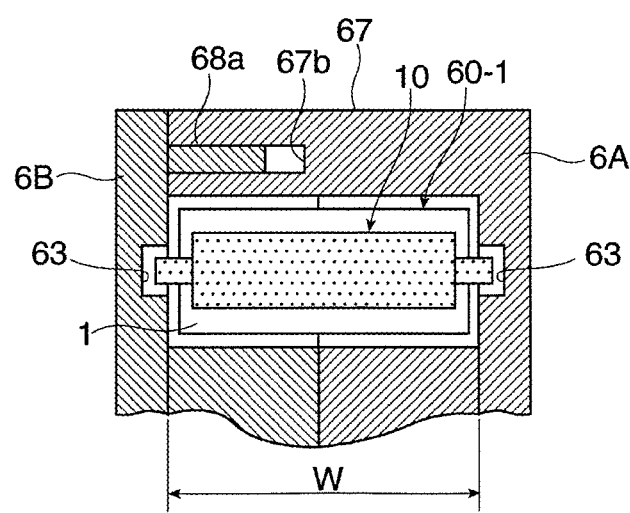
FIG. 9 is a schematic sectional view illustrating the vicinity of the scooping portion under a state in which the first half circulation segment and the second half circulation segment are combined with each other.

FIG. 9 illustrates the vicinity of the scooping portion 67 under a state in which the first half circulation segment 6A and the second half circulation segment 6B are combined with each other. In FIG. 9, the roller 1 and the coupler belt 10 are received in the inner direction change path 60-1 formed by joining the first half circulation segment 6A and the second half circulation segment 6B. Under the state in which the first half circulation segment 6A and the second half circulation segment 6B are combined with each other, the reinforcing protrusion 68a is inserted into the fitting hole 67b of the scooping portion 67, and thus the scooping portion 67 is securely fixed into the recess 68 of the second half circulation segment without any positional misalignment.

Figure 10:
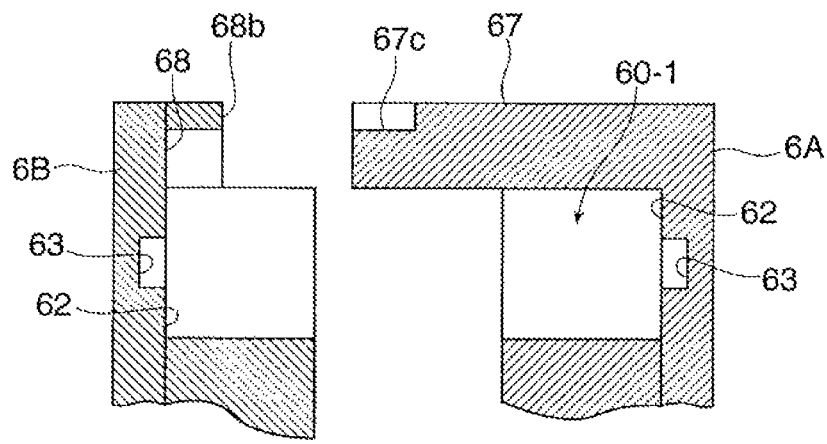
FIG. 10 is a schematic sectional view illustrating another example of a reinforcing structure of the scooping portion.

Note that, in the example illustrated in FIGS. 7 to 9, the reinforcing protrusion 68a is formed into a columnar shape so as to protrude from the second half circulation segment 6B, but may be formed into a different shape as long as the reinforcing protrusion 68a can prevent the positional misalignment of the scooping portion 67 relative to the recess 68. For example, as illustrated in FIG. 10, a wall-like reinforcing protrusion 68b may be formed along an outer edge of the recess 68, and the reinforcing protrusion 68b may be fitted into a step portion 67c formed along an outer edge of the scooping portion 67.

Figure 11:
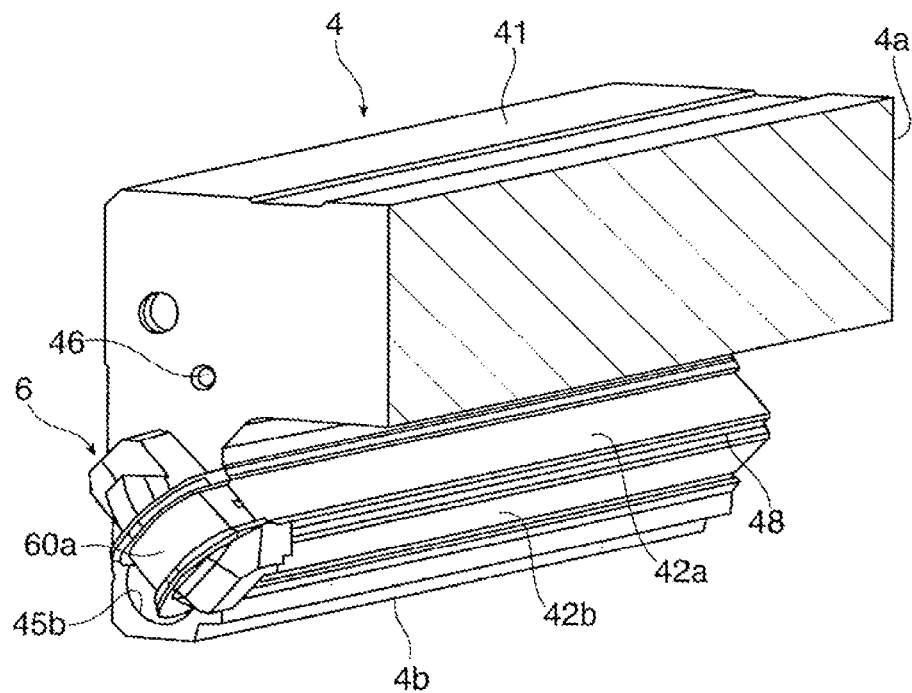
FIG. 11 is a perspective view illustrating a state in which the circulation path module is mounted on the main body member.

FIG. 11 is a perspective view illustrating a state in which the circulation path module 6 is mounted on the leg portion 4b of the main body member 4. FIG. 11 illustrates a state in which the return path pipe 7 of the circulation path module 6 is inserted into the upper through hole 45a of the leg portion 4b. In this state, the positioning protrusion 66 formed on the circulation path module 6 is fitted into the position reference hole 47 of the main body member 4. The length of the return path pipe 7 is set slightly larger than the length of the main body member 4 in its moving direction (in the longitudinal direction of the track member). When the return path pipe 7 is inserted into the through hole 45a until the direction change pipe 8 is brought into contact with the leg portion 4b, although the illustration is omitted in FIG. 11, a distal end of the return path pipe 7 slightly protrudes from an opposite surface of the leg portion 4b. In this state, the inner direction change path 60-1 incorporated into the direction change pipe 8 is connected to the lower load rolling surface 42b formed on the main body member 4, and the inner peripheral guide surface 60a of the outer direction change path 60-2 formed in the direction change pipe 8 is connected to the upper load rolling surface 42a of the main body member 4. FIG. 11 illustrates one end surface of the leg portion 4b having the circulation path module mounted thereon. At the opposite end surface of the leg portion 4b, the return path pipe 7 of another circulation path module 6 is inserted into the lower through hole 45b of the leg portion. Thus, the pair of circulation path modules 6 is combined across the leg portion 4b. Further, the main body member 4 includes the pair of leg portions, and hence four circulation path modules 6 are mounted on the main body member 4.

Figure 12:
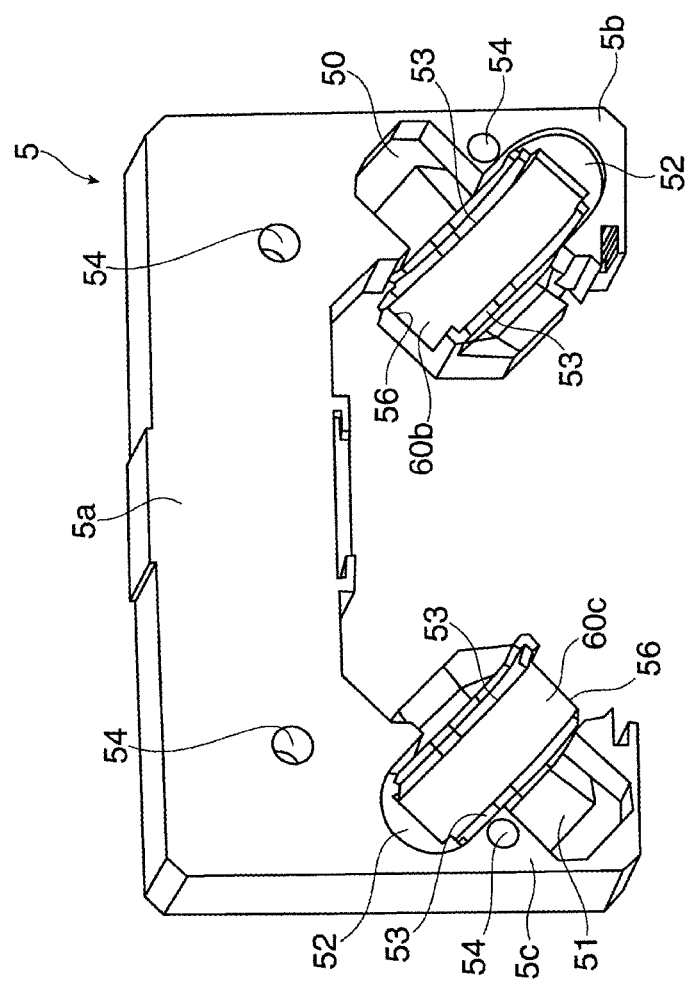
FIG. 12 is a perspective view illustrating a lid member of the rolling guide device according to the embodiment of the present invention.

FIG. 12 is a perspective view illustrating the lid member 5 to be mounted on the main body member 4 so as to cover the direction change pipes 8 of the circulation path modules 6. FIG. 12 illustrates the lid member 5 as seen from the main body member 4 side. The lid member 5 is manufactured by injection molding using a synthetic resin, and includes a mounting portion 5a corresponding to the horizontal portion 4a of the main body member 4, and a pair of leg portions 5b and 5c corresponding to the leg portions 4b of the main body member 4. Receiving grooves 50 and 51 for receiving the direction change pipes 8 of the circulation path modules 6 are formed in inner surfaces of the leg portions 5b and 5c, respectively, which are to be brought into abutment on the main body member 4. In this case, the receiving groove 50 formed in the leg portion 5b corresponds to the circulation path module 6 mounted on the main body member 4 in FIG. 11. Further, the receiving groove 51 formed in the leg portion 5c is oriented in a direction different by 180° from that of the receiving groove 50 formed in the leg portion 5b, and corresponds to the circulation path module 6 mounted on the leg portion 4b of the main body member 4 from an opposite side (far side of the drawing sheet) in FIG. 11.

Further, outer peripheral guide surfaces 60b and 60c corresponding to the inner peripheral guide surfaces 60a of the circulation path modules 6 are formed into a recessed curve surface shape on the inner surfaces of the leg portions 5b and 5c, respectively. The outer peripheral guide surfaces 60b and 60c are formed so as to intersect with the receiving grooves 50 and 51 in the respective leg portions 5b and 5c. Note that, the outer peripheral guide surface 60c formed on the leg portion 5c is oriented in a direction different by 180° from that of the outer peripheral guide surface 60b formed on the leg portion 5b. A scooping portion 56 for guiding the rollers, which have rolled along the rolling surface 20 of the track member 2, into the outer direction change path 60-2 is formed at one end of each of the outer peripheral guide surfaces 60b and 60c, which faces the track member 2.

A positioning recessed portion 52 on which the distal end surface of the return path pipe 7 of the circulation path module 6 is brought into abutment is formed in each of the leg portions 5b and 5c of the lid member 5. One end of each of the outer peripheral guide surfaces 60b and 60c is opened at the positioning recessed portion 52. Further, on both sides of each of the outer peripheral guide surfaces 60b and 60c, stepped portions 53 are formed along a longitudinal direction of each of the outer peripheral guide surfaces 60b and 60c. When the direction change pipe 8 of the circulation path module 6 is received in each of the receiving grooves 50 and 51, the stepped portions 53 serve as guide grooves for receiving the belt portions 12 of the coupler belt 10. Note that, reference symbol 54 of FIG. 12 represents a through hole for a fixing bolt to be used for fastening the lid member 5 to the main body member 4.

Figure 13:
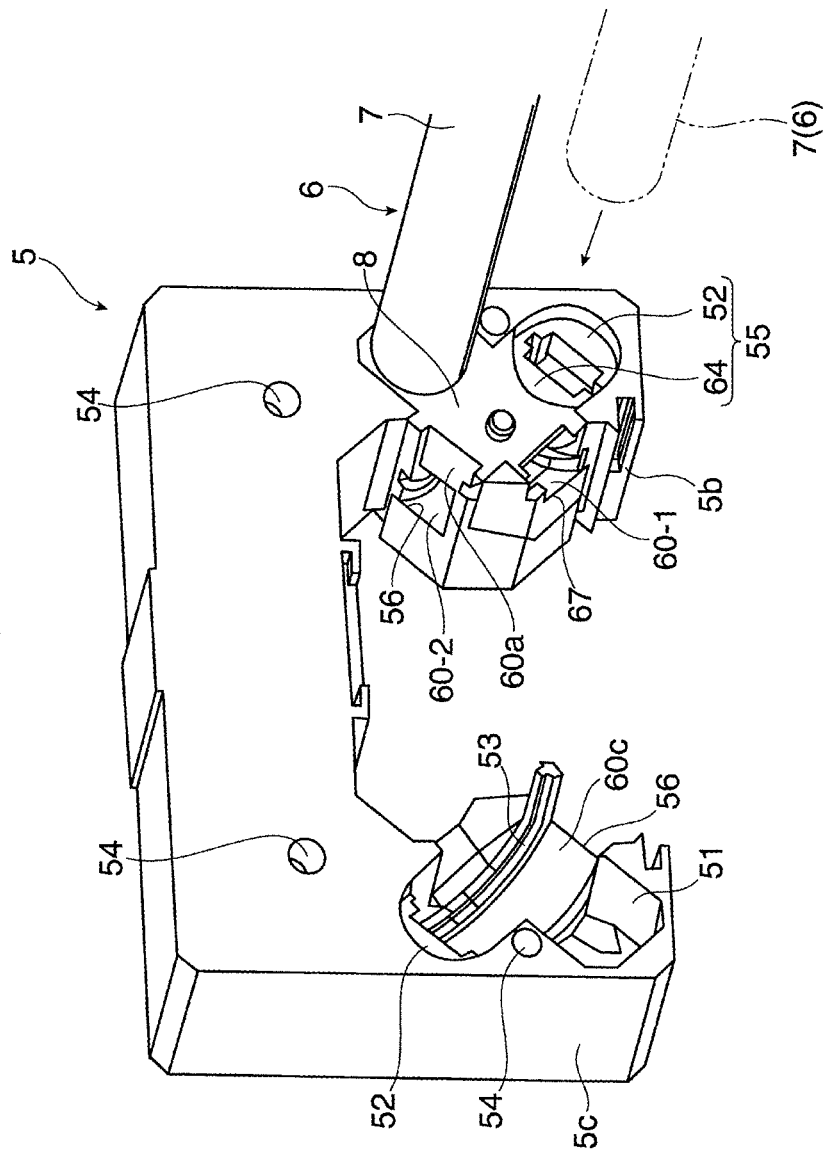
FIG. 13 is a perspective view illustrating a state in which the circulation path module is mounted on the lid member.

FIG. 13 is a perspective view illustrating a state in which the circulation path module 6 and the lid member are combined with each other. FIG. 13 illustrates a state in which the direction change pipe 8 of the circulation path module 6 is received in the receiving groove 50 on one side of the lid member 5. When the direction change pipe 8 is received in the receiving groove 50 of the lid member 5 as described above, the outer peripheral guide surface 60b of the lid member 5 and the inner peripheral guide surface 60a of the direction change pipe 8 are opposed to each other, to thereby complete the outer direction change path 60-2. At this time, the return path pipe 7 formed in the circulation path module 6 is inserted into the upper through hole 45a formed in the leg portion 4b of the main body member 4. Further, when the direction change pipe 8 is received in the receiving groove 50 of the lid member 5, the abutment recessed portion 64 formed in the direction change pipe 8 and the positioning recessed portion 52 formed in the lid member 5 are combined with each other, to thereby form a pipe receiving hole 55 having a substantially circular shape. The distal end of the return path pipe 7 of the other circulation path module 6, which protrudes from the lower through hole 45 formed in the leg portion 4b of the main body member 4, is fitted into the pipe receiving hole 55 in the arrow direction of FIG. 13. Thus, the outer direction change path 60-2 is connected to the return path 44 of the other circulation path module 6.

Further, the direction change pipe 8 of the circulation path module 6 is also received in the receiving groove 51 on the other side of the lid member 5, but the circulation path module 6 received in the receiving groove 51 has such a posture as to be vertically inverted relative to the circulation path module 6 received in the above-mentioned receiving groove 50. Note that, the pair of lid members 5 mounted on the main body member 4 from both sides in its moving direction corresponds to the lid members of FIG. 12 that are arranged so as to be opposed to each other, and hence the pair of lid members 5 has the same shape.

Further, the moving member 3 is completed by combining four circulation path modules 6 having the same shape and two lid members 5 having the same shape with the main body member 4 as described above. Two endless circulation paths for the rollers 1 are formed in each leg portion 4b of the main body member 4. That is, the inner direction change path 60-1 and the outer direction change path 60-2 are positioned at both ends of the upper load rolling surface 42a and both ends of the lower load rolling surface 42b of each leg portion 4b, and the inner direction change path 60-1 and the outer direction change path 60-2 are connected to each other through the return path 44 formed in the upper through hole 45a or the lower through hole 45b of the main body member 4. Further, the rollers 1 rolling along the rolling surface 20 of the track member 2 are guided into the inner direction change path 60-1 by the scooping portion 67 formed on the circulation path module 6 and positioned at the inlet of the inner direction change path 60-1, or are guided into the outer direction change path 60-2 by the scooping portion 56 formed on the lid member 5 and positioned at an inlet of the outer direction change path 60-2. In this manner, the rollers 1 are circulated in the above-mentioned endless circulation path.

When the rollers 1 rolling along the rolling surface 20 of the track member 2 enter the inner direction change path 60-1, the rollers 1 are brought into contact with the scooping portion 67 of the circulation path module 6. The circulation path module 6 is divided into the first half circulation segment 6A and the second half circulation segment 6B along the center line of each of the return path 44 and the inner direction change path 60-1, and the scooping portion 67 is also originally divided into the first half circulation segment 6A and the second half circulation segment 6B along the center line of the inner direction change path 60-1. However, as described above, in the rolling guide device of this embodiment, the scooping portion 67 is formed only on the first half circulation segment 6A, and the scooping portion 67 protrudes from the first half circulation segment 6A toward the second half circulation segment 6B by the length corresponding to the axial length of the roller 1. That is, the scooping portion 67 is not divided into the first half circulation segment 6A and the second half circulation segment 6B, and there is no joint surface between the first half circulation segment 6A and the second half circulation segment 6B in the scooping portion 67 at a center of the inner direction change path 60-1. Thus, no step is generated at a center of the scooping portion 67 due to an error in manufacturing the first half circulation segment 6A and the second half circulation segment 6B and an error in assembling the first half circulation segment 6A and the second half circulation segment 6B together. Accordingly, even when the rollers 1 repeatedly override the scooping portion 67 along with use over time, deformation of the scooping portion 67 can be prevented. As a result, the durability of the scooping portion 67 can be enhanced, thereby being capable of achieving smooth motion of the moving member 3 relative to the track member 2.

Further, the circulation path module 6 has the positioning protrusion 66 as the means for positioning the circulation path module 6 relative to the main body member 4. The positioning protrusion 66 is formed on the first half circulation segment 6A of the circulation path module 6, and the scooping portion 67 for guiding the rollers 1, which are rolling along the load path 43, into the inner direction change path 60-1 is also formed on the first half circulation segment 6A. Thus, the scooping portion 67 can be positioned with high accuracy relative to the main body member 4 having the load rolling surface 42 formed thereon. Also in this respect, the rollers 1 rolling along the track member 2 can smoothly be guided into the inner direction change path 60-1 of the circulation path module 6 by the scooping portion 67.

Further, as illustrated in FIG. 9, the reinforcing protrusion 68a to be fitted into the scooping portion 67 is formed on the second half circulation segment 6B. When the first half circulation segment 6A and the second half circulation segment 6B are combined with each other so as to construct the circulation path module 6, the reinforcing protrusion 68a on the second half circulation segment 6B side is inserted into the scooping portion 67 on the first half circulation segment 6A side, to thereby restrict displacement of the scooping portion 67 relative to the second half circulation segment 6B. Thus, even when an external force is applied from each roller 1 to the scooping portion 67 in a direction of pressing the scooping portion 67 from an inside toward an outside of the inner direction change path 60-1, the shape of the scooping portion 67 can be maintained against the external force. Also in this respect, the durability of the scooping portion 67 can be enhanced, thereby being capable of achieving smooth motion of the moving member 3 relative to the track member 2.

The invention claimed is:

1. A rolling guide device, comprising:
   a track member; and
   a moving member assembled to the track member through intermediation of a multitude of rolling elements, the moving member having formed therein a plurality of rolling-element endless circulation paths comprising inner direction change paths and outer direction change paths overlapping with each other,
   wherein the moving member comprises:
      a main body member having load rolling surfaces and return paths for the rolling elements;
      direction change pipes having formed therein the inner direction change paths and having inner peripheral guide surfaces of the outer direction change paths, respectively; and
      lid members each being mounted on the main body member and having outer peripheral guide surfaces of the outer direction change paths, and
   wherein each of the direction change pipes comprises:
      a first half circulation segment and a second half circulation segment divided in a plane forming a corresponding one of the inner direction change paths; and
      a scooping portion for guiding the rolling elements, which are rolling along each of the load rolling surfaces, into the corresponding one of the inner direction change paths, the scooping portion being formed only on the first half circulation segment without being formed on the second half circulation segment.

2. A rolling guide device according to claim 1, further comprising means for positioning the each of the direction change pipes relative to the main body member, the means for positioning being provided on the first half circulation segment having the scooping portion formed thereon.

3. A rolling guide device according to claim 2,
   wherein the main body member has a position reference hole formed therein so as to serve as a position reference for the each of the direction change pipes, and
   wherein the first half circulation segment comprises a positioning protrusion serving as the means for positioning, the positioning protrusion being fitted into the position reference hole.

4. A rolling guide device according to claim 2, wherein the second half circulation segment comprises a reinforcing protrusion formed thereon so as to be fitted into the scooping portion formed on the first half circulation segment.

5. A rolling guide device according to claim 3, wherein the second half circulation segment comprises a reinforcing protrusion formed thereon so as to be fitted into the scooping portion formed on the first half circulation segment.

* * * * *